United States Patent
Liot et al.

(10) Patent No.: US 6,210,740 B1
(45) Date of Patent: Apr. 3, 2001

(54) METHOD FOR TREATING LIQUID EGG WHITES

(75) Inventors: Roger Liot, 19 Avenue la Belle Indienne, 86450 Pleumartin; Laurence Anza, Paris, both of (FR)

(73) Assignee: Roger Liot, Pleumartin (FR)

(*) Notice: Subject to any disclaimer, the term of this patent is extended or adjusted under 35 U.S.C. 154(b) by 0 days.

(21) Appl. No.: 09/214,627

(22) PCT Filed: Jul. 4, 1997

(86) PCT No.: PCT/FR97/01200

§ 371 Date: Dec. 30, 1998

§ 102(e) Date: Dec. 30, 1998

(87) PCT Pub. No.: WO98/01038

PCT Pub. Date: Jan. 15, 1998

(30) Foreign Application Priority Data

Jul. 4, 1996 (FR) .................................. 96 08356

(51) Int. Cl.⁷ ..................................... A23L 1/32
(52) U.S. Cl. ............................. 426/614; 614/399
(58) Field of Search ..................... 426/614, 399

(56) References Cited

U.S. PATENT DOCUMENTS

| | | | |
|---|---|---|---|
| 4,957,760 | * 9/1990 | Swartzel et al. | 426/614 |
| 5,167,976 | * 12/1992 | Papetti | 426/614 |
| 5,455,054 | 10/1995 | Bryson et al. | 426/106 |
| 5,612,076 | * 3/1997 | Samimi et al. | 426/614 |
| 5,741,539 | * 4/1998 | Knipper et al. | 426/614 |

FOREIGN PATENT DOCUMENTS

| | | |
|---|---|---|
| 94 09 959.6 | 10/1994 | (DE) . |
| 44 13 500 | 12/1994 | (DE) . |
| 44 21 533 | 12/1995 | (DE) . |
| 0 373 026 | 6/1990 | (EP) . |
| 2 492 226 | 4/1982 | (FR) . |

OTHER PUBLICATIONS

Database Abstract. AN 78(06):Q0072 FSTA. Journal of Food Technology. 13(1) pp. 25–30. Authors: Northolt et al, 1978.*

* cited by examiner

Primary Examiner—Anthony J. Weier
(74) Attorney, Agent, or Firm—Smith, Gambrell & Russell, LLP

(57) ABSTRACT

Process for treating fresh egg products which includes, after breaking fresh eggs and separating the constituents, a heat treatment of the non-concentrated liquid egg white and packaging in air tight containers, characterized in that the eggs are broken at a temperature of between 0° and 18° C., the temperature of the liquid egg white for the heat treatment then being raised slowly, in a tank 6 equipped with a heat exchanger 9, over a period of time of between at least 30 and 240 minutes up to a temperature of between 40° and 48° C. and preferably between 42° and 45° C., and then the temperature is maintained at this level for a period of between 1 and 5 days (oven 24).

20 Claims, 1 Drawing Sheet

METHOD FOR TREATING LIQUID EGG WHITES

REFERENCE TO RELATED APPLICATIONS

This application is the U.S. national stage of international patent application serial no. PCT/FR97/01200, filed Jul. 4, 1997 which is relied upon and incorporated in its entirety and is a continuation of French patent application serial no. 96/08356 filed Jul. 4, 1996.

The subject of the present invention is a process for treating fresh egg products comprising, after breaking the fresh eggs and separating the constituents, a heat treatment of the liquid egg white and packaging in air tight containers.

The liquid egg white in question in the present invention is a fresh or raw egg white, in the liquid state, obtained after separating the white and the yolk by mechanically breaking fresh eggs. It is therefore a non-fermented liquid product whose normal pH is of the order of 9 and which contains no additive for preservation.

Processes which make it possible to preserve egg products, and in particular egg white, for the longest possible period have been devised for a long time.

Accordingly, attempts have been made to pasteurize egg products in order to eliminate pathogenic microorganisms, in particular Salmonellae. Heat pasteurization has, however, considerable risks if it is desired to avoid degradation of the product. As regards egg white in particular, it is known that it coagulates from 57° C. Moreover, when egg white is heated above 56.7° C., substantial denaturation and in particular a decrease in its overrun or foaming capacity is observed. This denaturation can in particular be demonstrated by observing the volume of foam produced or the stability of foams produced from such a treated egg white. It has even been possible to observe a decrease in the foaming power during the rise in temperature to 49° C. for 1 hour or 43° C. for 6 hours (CUNNINGHAM in Egg Science and Technology 1977 page 166). COTTERILL and GLAUERT have shown since 1973 (Egg Science and Technology 1977) these thermal destructions which could be observed for various types of egg products and in particular for liquid egg white when the temperature is raised to 50° C. They observed that when the temperature increases, the time necessary to obtain complete destruction of microorganisms decreases and conversely. No measurement was however carried out for temperatures below 50° C.

In practice, it was recommended for the pasteurization of liquid egg white to use temperatures close to 55° to 56° C. However, at this temperature, a substantial impairment of the overrun capacity is observed (Aviculture Francaise 1988 page 790).

To carry out the heat treatments for the pasteurization, plate exchangers are used so as to maintain the pasteurization temperature for a very short period. The use of such plate exchangers allows a very rapid heating with a very short residence time. It has been observed that by flash heating, it was possible to treat liquid egg white up to 59° C. or even rising up to 62° C. without increasing turbidity (Egg Science and Technology 1977 page 166).

Such pasteurization processes at high temperature and for a very short period are known by the name HTST (High Temperature Short Time).

To avoid the risks of heat-degradation of the products, other processes have been devised which combine heat with another component. Accordingly, it was thought to reduce the pH to 7 by addition of lactic acid and aluminium sulphate and then to carry out a pasteurization at 60°–61.7° C. for 3 to 4 minutes.

Another method recommended was to add hydrogen peroxide which plays the role of bactericidal agent. After heating the egg white at 51.7°–53.3° C. for 1 min 30 sec, the hydrogen peroxide is added and left in contact with the egg white for 2 minutes.

Despite the commercial use of these processes, there is a need for a process of treatment which would not use a chemical additive which can cause various disadvantages including the risk of an additive residue remaining in the final product. Furthermore, these processes risk causing the undesirable modification of the natural properties of the egg.

U.S. Pat. No. 2,377,644 (PARSONS) describes a process for treating egg white which makes it possible to obtain a concentrated product which may then be reconstituted so as to resemble a natural liquid egg white. According to the process described, the natural liquid egg white is dried at a temperature below the coagulation temperature so as to reduce the quantity of water contained in the product and to obtain a dry matter concentration of between 25 and 60%. After this evaporation step, the product is maintained at a temperature of 7° to 10° C. for 12 to 14 hours. The concentrated egg white obtained can then be stored in refrigerated or frozen form.

French patent application 2,047,412 (PARKSON) also provides a process for treating egg white by concentrating the solid matter content, the heating being carried out under partial vacuum at a temperature of 30° to 35° C.

Such pasteurization under partial vacuum makes it possible to reduce the pasteurization temperature and the duration of heat treatment for obtaining the same bacteriological results. In practice, it is observed, however, that this type of process is difficult to carry out because it requires precise, constant and exact monitoring both of the temperature parameter and of the pressure parameter in the entire plant.

There has also been described in French patent 2,367,435 (LIOT) a process for treating liquid egg products, especially egg white, which may be in the concentrated or non-concentrated state, consisting in adding appropriate quantities of sugar or salt until an osmotic weight of at least 20 atmospheres is obtained. The dissolved gases are then eliminated until an oxygen content of less than 3 ppm is obtained. The elimination of the dissolved gases is carried out by bubbling an inert food gas, optionally under vacuum. The degassing can also be carried out by raising the temperature for a short period of time up to about 50° to 60° C., the temperature being chosen according to the degree of concentration and the quantity of sugar or salt added.

A subsequent heat treatment is applied to the product after packaging in a closed container or under circulating neutral gas at a temperature of 50° to 65° C. for a period of time of 4 hours to several days, and egg products are thus obtained, and in particular egg white in which the proteins are practically not denatured. The product obtained is practically sterilized in the sense that it contains less than 1000 microbes per gram.

This type of product, despite its advantages, cannot be used for all applications given that it contains, as additive for preservation, sugar or salt in substantial proportions. Furthermore, the products obtained are concentrated products which have to be diluted in order to reconstitute a liquid product similar to a natural product.

It can therefore be seen that there is a great need for a liquid egg product resembling as closely as possible a natural product, whose characteristics are those of a natural product and which can nevertheless be preserved, preferably at room temperature, for a long period.

It has now been discovered, surprisingly, that it was possible, by a specific combination of specific steps during the process for treating non-concentrated liquid egg white, to obtain such a liquid product free of any additive for preservation.

The subject of the invention is therefore a process for treating fresh egg products which comprises a heat treatment of the non-concentrated liquid egg white which makes it possible to obtain a liquid product which is in every respect identical to the liquid egg white obtained immediately after breaking a fresh egg.

The subject of the invention is in particular a process allowing the production of a non-concentrated liquid egg white free of additives for preservation and which can nevertheless be stored for at least three months in its packaging at room temperature.

The process for treating fresh egg products according to the invention which makes it possible to solve these problems comprises, after breaking fresh eggs and separating the constituents, a heat treatment of the non-concentrated liquid egg white and packaging in air tight containers.

The eggs are broken at a temperature which may be between 0° and 18° C. The temperature of the liquid egg white for the heat treatment is raised slowly over a period of time of between at least 30 and 240 minutes up to a temperature of between 40° and 48° C. and preferably between 42° and 45° C. After this phase of raising the temperature, the temperature is maintained at this level for a period of between 1 and 5 days.

It has been observed, quite surprisingly, that it was thus possible to obtain a non-concentrated liquid egg white which contains less than 10 mesophilic aerobic microbes per gram and no pathogenic microbes (in particular Salmonellae and Staphylococci) and which can be stored in its air tight container for at least three months at room temperature or at temperatures of between 5° and 35° C. Furthermore, the liquid egg white thus obtained has organoleptic qualities which are practically identical to those of a fresh egg which has just been broken and having in particular the same coagulating and overrun qualities, so that it can be said that the process of the invention makes it possible in a way to obtain a "sterilized" product without the addition of any additive for preservation and in particular without addition of sugar or salt as was the case in earlier processes and without the product being subjected to any concentration by evaporation of water as was also previously done in some known processes.

To carry out the process of the invention, the procedure is preferably carried out in the following manner: after the temperature of the liquid egg white has reached the temperature of between 40° and 48° C. and preferably between 42 and 45° C., the liquid egg white is introduced into air tight containers and the product thus packaged is maintained in an oven at the temperature of between 40° and 48° C. and preferably between 42° and 45° C. for the period of between 1 and 5 days which was mentioned above.

Although it is difficult to understand the reason why a product of very high quality is thus obtained, it is possible to think that the invention is based on the idea of taking advantage of the natural autodefensive power of the egg. Indeed, the egg, as a living cell, possesses numerous means of defence against external microbial contaminations. According to the invention, to thereby take advantage of the natural characteristics of the egg, it is important to raise the temperature slowly as indicated above, and then to maintain this temperature for a substantial period. The process of the invention therefore runs completely counter to the earlier methods which in general recommended, in order to destroy pathogenic microbes, heating the liquid product to a high temperature quite close to the coagulation temperature but for a very short period.

In the process according to the invention, it is also possible, and excellent results are obtained in this manner, to maintain the liquid egg white at the temperature of between 40° and 48° C. and preferably between 42° C. and 45° C. before introducing the product into air tight containers and for a period of between 1 and 10 hours and preferably between 2 and 5 hours.

It is also possible to separate the different essential steps of the process of the invention by carrying out an intermediate step of cooling the liquid egg white. Accordingly, after the liquid egg white has been slowly heated as stated above to the temperature of between 40° and 48° C. and preferably between 42° and 45° C., it is possible to cool the liquid egg white to room temperature while, however, maintaining the product protected from air and then to introduce the liquid egg white into air tight containers at room temperature. The temperature is then again raised slowly over a period of time of between at least 30 and 240 minutes up to a temperature of between 40 and 48° C. and preferably between 42° and 45° C. The packaged product is maintained at this temperature for a period of between 1 and 5 days.

Such a variant of the process of the invention is however generally reserved for packaging containers having a low capacity, of the order of 1 to 5 liters. For packaging containers having a higher capacity, which may be as high as 200, 500 kg or more, it would be preferable, for obvious reasons of saving energy, not to cool the product after its temperature has been raised slowly but on the contrary to introduce it into the packaging containers while it has the high holding temperature.

In the process of the invention, it should be noted that it is possible, during the temperature rise, to subject the liquid egg white, before it has been introduced into the air tight containers, to a temperature homogenization and stabilization action by slow mixing or by recycling in a closed loop. This action should however remain limited to the homogenization and the stabilization of the temperature, given that vigorous stirring is harmful to the quality of the final result.

Raising the temperature of liquid egg white for its heat treatment may be carried out immediately after breaking the eggs and separating the constituents, after optionally filtering in order to avoid any introduction of impurities such as egg shell debris. It is also possible to defer the application of the heat treatment. In this case, the liquid egg white obtained after breaking the fresh eggs and separating the constituents is preferably cooled to a temperature of 3° to 5° C. and maintained at this temperature up to the heat treatment for a period which should, however, not exceed a few days.

In any case, raising the temperature and the heat treatment itself is preferably carried out in a tank having a large capacity, for example of the order of 1000 to 10,000 liters. This tank may be closed so as to avoid any risk of introducing dust or foreign substances. It may also be open to the open air.

To ensure good homogeneity of the temperature during the phase of rise in temperature as well as during the holding phase, the liquid egg white is preferably heated by recycling in a closed loop from the tank, via a heat exchanger situated inside the tank. The liquid product may be carried in the recycling loop by any means such as a packingless MOUVEX-type pump which does not cause excessive stirring during flow.

The temperature may be advantageously held, after the required temperature mentioned above has been reached, in an additional buffer tank also comprising a recycling loop equipped with an external heat exchanger, the product being carried as above with a pump of the same type.

The liquid egg white is introduced into the air tight containers, after the phase of slow rise in temperature and the optional holding of the temperature during the period indicated above, by means of a filling device connected directly to the recycling loop of the tank or to that of the buffer tank when it is provided. The air tight containers are then transported with the products which they contain into an oven where the temperature between 40° and 48° C. and preferably between 42° and 45° C. is maintained for a period of 1 to 5 days.

The containers used are of course suited to such a heat treatment and have, in addition, an appropriate internal lining in contact with the food products. Flexible packagings are preferably used which are provided in the form of bags from which it is easy, after filling, to drive most of the air present therein before hermetically closing the bag, for example, by sealing its walls or by leaktight closure by means of a sealing plug.

In general, the material chosen for the packaging should be suitably impermeable to air. It should furthermore be preferably flexible, which facilitates, as stated, the elimination of most of the air before closing the packaging. Finally, the material should be capable of withstanding the oven temperature for a period of 1 to 5 days, and preferably of the order of three days, the packaging then being maintained closed, thus avoiding any evaporation of the water contained in the liquid egg product.

As an example of material which can be used as packaging bags or sachets, there may be mentioned complex films based on plastic or a composite material which may include a metallic or metallized sheet, for example based on polyethylene terephthalate/polyethylene or alternatively polyethylene terephthalate/aluminium/polyethylene. It is also possible, in some cases, to use rigid containers made of metal, synthetic material, glass or a combination of these materials and containing a leaktight closure.

Although it has been indicated that in practice the liquid product is introduced into the packaging containers after the temperature has been raised slowly in the tank by means of an external recycling loop, it is also possible to envisage placing the liquid egg product in the leaktight packagings immediately after breaking the eggs and separating the constituents. The slow rise in the temperature is then carried out on the product contained in the airtight and duly closed packagings. The temperature may be raised in the same manner as mentioned above, that is to say up to a temperature of between 40° and 48° C., preferably between 42° and 45° C., over a period of time of between at least 30 and 240 minutes. The temperature may then be maintained at this level in the oven for a period of between 1 and 5 days.

Such a process can however only be envisaged for packagings having a low capacity so that the rise in temperature in the oven allows a rise in the temperature of the product contained in the packagings in a sufficiently homogeneous and uniform manner. In practice, such a variant of the process of the invention can only be envisaged for packagings hardly exceeding 1 or 5 kg.

In some cases and in order to improve the appearance and the nutritive qualities of the liquid egg product, it will be possible to add to the liquid egg white before the packaging phase in the airtight containers, any appropriate constituents such as colourings, vegetable or inorganic fat, vitamins, thickeners and the like. Of course, these constituents which are added to the liquid egg product do not participate in any manner in the preservation of the product which is achieved solely by using the process of the invention.

The invention will now be described more precisely using the example below which illustrates in a nonlimiting manner an embodiment of the process of the invention.

DETAILED DESCRIPTION OF THE INVENTION

Figure 1:
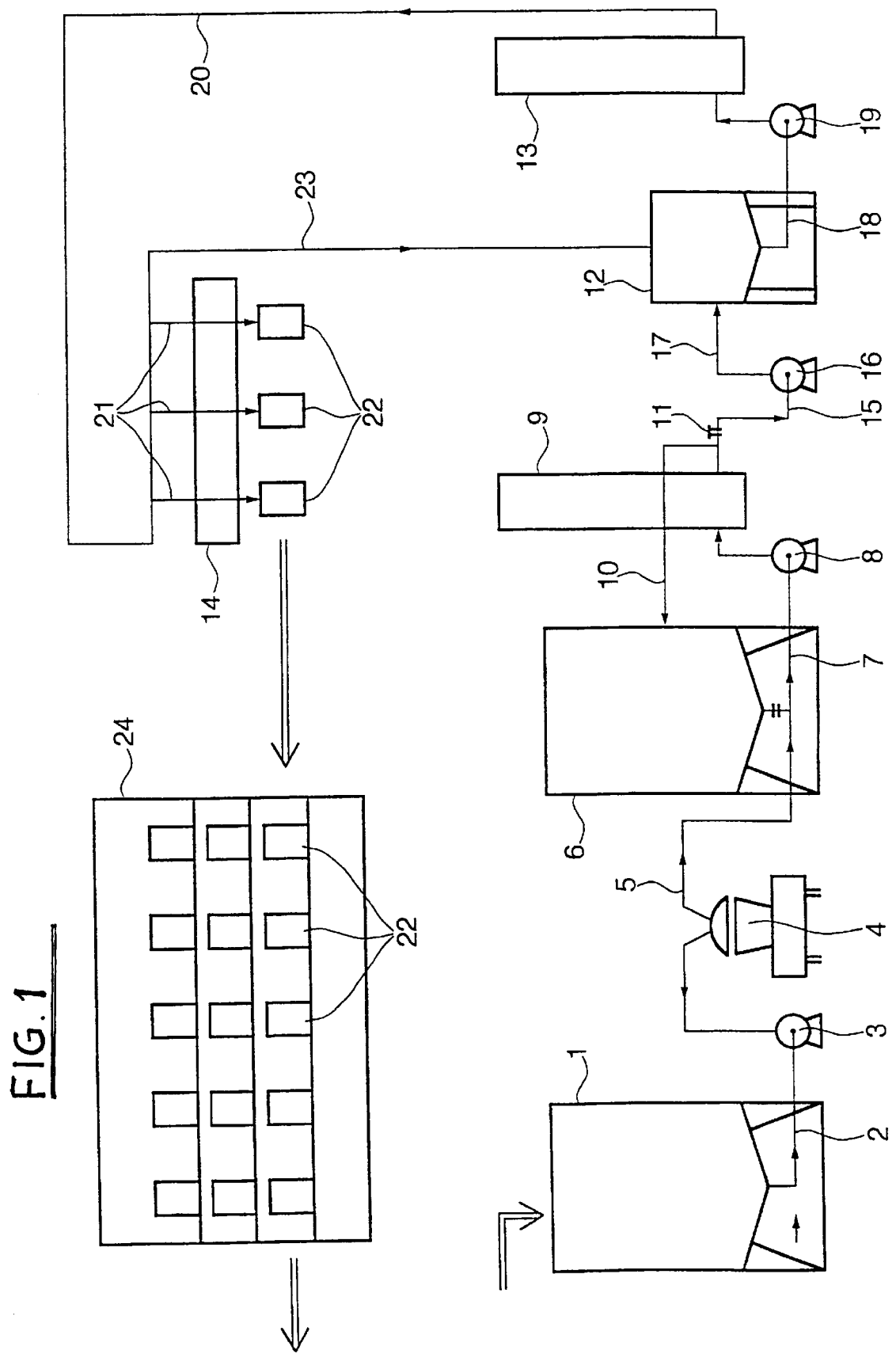
FIG. 1 illustrates a schematic example of an industrial plant which makes it possible to carry out the process of the invention.

The plant comprises a tank 1 which may contain 4000 kg of liquid egg white introduced into the said tank and obtained from fresh eggs broken at the temperature of 18° C. The liquid egg white is stored in the tank 1 after having been cooled to the temperature of 3° C.

After storing for about 2 hours at this temperature, this liquid mass is extracted from the tank 1 by the pipeline 2 by means of a pump 3. The liquid product thus pumped is freed of its impurities in a centrifuge 4 before being introduced by the pipeline 5 into the lower part of a heating tank 6 which may also contain 4000 kg of liquid product. The liquid product present in the tank 6 is permanently recycled by means of an extraction pipeline 7 situated at the base of the tank 6, the liquid product being circulated by the pump 8, passing through an external heat exchanger 9 which allows both the slow rise in temperature according to the process of the invention and the holding of the temperature, the liquid product being reinjected, at the outlet of the exchanger 9, into the tank 6 by the pipeline 10. The temperature of the liquid product present in the tank 6 is thus raised by continuous recycling until a temperature of 44° C. is reached. The duration of the rise in temperature is 2 h 30 min.

When this temperature of 44° C. has been reached for the entire product present in the tank 6, this being detected by a temperature sensor not illustrated in the FIGURE, the valve 11 is opened so as to allow the passage of the liquid product, still maintained at the temperature of 44° C. into the conditioning loop comprising a buffer tank 12, having a capacity below that of the tank 6, and a second external heat exchanger 13 as well as a conditioning and automatic packaging device 14. The temperature of the liquid product is maintained at 44° C.

The liquid egg white is pumped by the pipeline 15, by means of the pump 16 which feeds, via the pipeline 17, the tank 12. The latter comprises an extraction pipeline 18 in the lower part through which the liquid egg white is pumped by means of the pump 19 into the heat exchanger 13. The product, whose temperature is still maintained at 44° C., then passes through the pipeline 20, into the conditioning and packaging device 14 which comprises several filling heads symbolized by the arrows 21. The liquid product is introduced into the flexible packaging bags 22 whose upper lips are hot sealed after filling. The excess liquid product returns to the tank 12 through the pipeline 23.

As soon as it has been packaged, protected from air, into the duly sealed flexible bags 22, the liquid egg white is stored for three days in an oven 24, in which a temperature of 44° C. is maintained with a precision of ±0.5° C.

Once the period of three days of storage at 44° C. has passed, the liquid egg white still contained in the leaktight packagings 22 may be left in the open air for cooling. The product obtained may then be stored for at least three months at room temperature. The storage temperature may vary from 5° to 35° C. without it being possible to detect notable modifications in the quality of the product.

The various pumps used, referenced 3, 8, 16 and 19, are preferably packingless MOUVEX-type positive displacement pumps.

A product thus manufactured was subjected to tests designed to measure the overrun qualities as well as the bacteriological qualities of the product and to compare the results obtained with a liquid white which is not treated according to the invention, that is to say obtained immediately after breaking fresh eggs.

The liquid egg white is whipped with the aid of a beater of the HOBART N-50 G trade mark having a bowl capacity of 2.5 l. The apparatus was used with the speed marked 3 on the speed setting. The beating time was 90 seconds for a quantity of 200 g of liquid egg white. The overrun was measured with reference to the weight of foam in a 79-ml cup. More precisely, the "overrun" is defined as the reciprocal of the weight of the foam expressed in grams, in a volume of 79 ml. The behaviour of the foam of the beaten egg white was tested by measuring the volume of liquid that has fallen to the bottom of a 2000-ml container after it has been filled with the foam obtained from 200 g of liquid egg white, after a period of 1 hour. The results obtained are indicated in table I.

TABLE I

| Product | Treatment | Density of the foam (in kg/l) | Overrun (in g$^{-1}$) | Foam behaviour (liquid measured in ml) |
|---|---|---|---|---|
| Non-treated egg white | none | 0.103 | 0.123 | 11.5 |
| Egg white according to the invention | treatment according to the invention including the final holding at 44° C. for 4 days | 0.081 to 0.098 | 0.156 to 0.129 | 7.5 to 13.5 |

The results show that the liquid egg white treated according to the present invention makes it possible to obtain excellent foam qualities after beating. The density of the foam is indeed less than that obtained with a non-treated liquid egg white. Likewise, the overrun obtained as well as the foam behaviour over time are superior to those exhibited by a non-treated egg white whipped by beating.

The bacteriological qualities of the liquid egg white and its good storage behaviour over time were measured by carrying out a conventional bacteriological analysis (total aerobic microbes, staphylococci, salmonellae, enterobacteria).

The liquid egg white treated according to the invention was analysed immediately after the end of the treatment by opening one of the containers, and then after 2 months of storage at 25° C., by opening another container.

By way of comparison, a non-treated liquid egg white obtained by breaking fresh eggs and maintained for 1 hour at +4° C. was analysed as well as a liquid egg white pasteurized by conventional treatment at 56° C. for a period of 6 minutes 30 seconds and then frozen.

Table II shows the result of these comparative tests.

TABLE II

| Product | Total flora Per g | Entero- bacteria per g | Staphylcocci per g | Salmonellae per 25 g |
|---|---|---|---|---|
| Nontreated liquid egg white | 10,000 to 30,000 | 500 to 5000 | absence or presence | absence or presence |
| Frozen pasteurized liquid egg white | <100 to 6000 | <10 to 10 | presence about once out of 2 | presence about once out of 2 |
| Treated liquid egg white, according to the invention (just after treatment) | <10 | <10 | constant absence | constant absence |
| Treated liquid egg white, according to the invention (after 2 months of storage at 25° C.) | <10 | <10 | constant absence | constant absence |

These results show that the treatment according to the invention makes it possible to very clearly improve the bacteriological qualities up to the production of a product which can be truly described as being "sterile" since the bacterial flora does not increase over time even if the packaged product is stored at 25° C. The same results are in fact obtained when the packaged product is stored at 30° or at 40° C.

What is claimed is:

1. A process of treating liquid egg whites, comprising:
    heating liquid egg whites slowly, over a period of 30 to 240 minutes, to a temperature of 40° to 48° C.;
    introducing the liquid egg whites into an air tight container; and
    maintaining said temperature of the liquid egg whites for a period of 1 to 5 days.

2. The process according to claim 1, wherein said temperature is 42° to 45° C.

3. The process according to claim 1, comprising a further intermediate step, following the heating step, of maintaining the temperature of the liquid egg whites at said temperature for 1 to 10 hours, prior to the step of introducing the liquid egg whites into an air tight container.

4. The process according to claim 2, comprising a further intermediate step, following the heating step, of maintaining the temperature of the liquid egg whites at said temperature for 1 to 10 hours, prior to the step of introducing the liquid egg whites into an air tight container.

5. The process according to claim 3, wherein the period of maintaining the temperature of the liquid egg whites at said temperature, prior to the step of introducing the liquid egg whites into an air tight container, is 2 to 5 hours.

6. The process according to claim 4, wherein the period of maintaining the temperature of the liquid egg whites at said temperature, prior to the step of introducing the liquid egg whites into an air tight container, is 2 to 5 hours.

7. The process according to claim 1, comprising two further intermediate steps, as follows:
    an intermediate step, following the step of heating the liquid egg whites slowly, and prior to the step of introducing the liquid egg whites into an air tight container, of cooling the liquid egg whites to room temperature, while protecting the liquid egg whites from air; and an intermediate step, following the step of introducing the liquid egg whites into an air tight container, and prior to the step of maintaining said temperature of the liquid egg whites at 40° to 48° C. for from 1 to 5 days, of raising the temperature slowly, over a period of 30 to 240 minutes, to a temperature of 40° to 48° C.

8. The process according to claim 1, comprising two further intermediate steps, as follows:

an intermediate step, following the step of heating the liquid egg whites slowly, and prior to the step of introducing the liquid egg whites into an air tight container, of cooling the liquid egg whites to room temperature, while protecting the liquid egg whites from air; and an intermediate step, following the step of introducing the liquid egg whites into air tight containers, and prior to the step of maintaining said temperature of the liquid egg whites between 42° and 45° C. for a period of between 1 and 5 days, of raising the temperature slowly, over a period of time of between 30 and 240 minutes, to a temperature of between 42° and 45° C.

9. The process according to claim 1, wherein during the heating of the liquid egg whites slowly, and prior to the introducing of the liquid egg whites into air tight containers, the liquid egg whites are subjected to temperature homogenization and stabilization by slow mixing or recycling of the liquid egg whites in a closed loop.

10. The process according to claim 2, wherein during the heating of the liquid egg whites slowly, and prior to the introducing of the liquid egg whites into air tight containers, the liquid egg whites are subjected to temperature homogenization and stabilization by slow mixing or recycling of the liquid egg whites in a closed loop.

11. The process according to claim 1, wherein prior to the heating of the liquid egg whites slowly, the egg whites are at a preliminary temperature of between 3° and 5° C.

12. The process according to claim 2, wherein prior to the heating of the liquid egg whites slowly, the egg whites are at a preliminary temperature of between 3° and 5° C.

13. The process according to claim 1, wherein the heating of the liquid egg whites slowly is carried out in a tank having a capacity of 1000 to 10,000 liters.

14. The process according to claim 2, wherein the heating of the liquid egg whites slowly is carried out in a tank having a capacity of 1000 to 10,000 liters.

15. The process according to claim 13, wherein the heating of the liquid egg whites slowly in the tank is carried out with recycling in a closed loop via a heat exchanger located outside the tank.

16. The process according to claim 14, wherein the heating of the liquid egg whites slowly in the tank is carried out with recycling in a closed loop via a heat exchanger located outside the tank.

17. The process according to claim 1, wherein the maintaining of the temperature is in an additional buffer tank by recycling in a closed loop via a heat exchanger situated outside the buffer tank.

18. The process according to claim 2, wherein the maintaining of the temperature is in an additional buffer tank by recycling in a closed loop via a heat exchanger situated outside the buffer tank.

19. The process according to claim 1, wherein prior to the introducing of the liquid egg whites into an air tight container, the liquid egg whites are supplemented with at least one member selected from the group consisting of colorings, vegetable fat, animal fat, vitamins, thickeners and additional nutritives.

20. The process according to claim 2, wherein prior to the introducing of the liquid egg whites into an air tight container, the liquid egg whites are supplemented with at least one member selected from the group consisting of colorings, vegetable fat, animal fat, vitamins, thickeners and additional nutritives.

* * * * *